(12) United States Patent
Goossens

(10) Patent No.: US 7,209,280 B2
(45) Date of Patent: Apr. 24, 2007

(54) OPTICAL DEVICE COMPRISING A POLYMER ACTUATOR

(75) Inventor: Hendrik Josephus Goossens, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/540,685

(22) PCT Filed: Dec. 5, 2003

(86) PCT No.: PCT/IB03/05822

§ 371 (c)(1),
(2), (4) Date: Jun. 24, 2005

(87) PCT Pub. No.: WO2004/059364

PCT Pub. Date: Jul. 15, 2004

(65) Prior Publication Data

US 2006/0072181 A1   Apr. 6, 2006

(30) Foreign Application Priority Data

Dec. 30, 2002 (EP) .................... 02293263

(51) Int. Cl.
*G02B 26/00* (2006.01)
(52) U.S. Cl. ..................................... 359/290; 359/291
(58) Field of Classification Search ................ 359/290, 359/291, 223, 224, 298
See application file for complete search history.

(56) References Cited

U.S. PATENT DOCUMENTS

| 6,004,442 | A  | * | 12/1999 | Choulga et al. | ............ 204/416 |
| 6,369,954 | B1 | * | 4/2002  | Berge et al.   | ................ 359/666 |
| 6,844,960 | B2 | * | 1/2005  | Kowarz         | ..................... 359/298 |
| 6,859,233 | B1 | * | 2/2005  | Sasama         | ..................... 348/349 |
| 6,965,467 | B2 | * | 11/2005 | Yamamoto et al.| ......... 359/290 |
| 2001/0040735 | A1 | | 11/2001 | Schachar | |

* cited by examiner

*Primary Examiner*—Timothy Thompson
*Assistant Examiner*—Jerry Fang
(74) *Attorney, Agent, or Firm*—Michael E. Belk

(57) ABSTRACT

An optical device includes a polymer film having first and second surfaces. A first electrode is mapped on the first surface and a second electrode is mapped on the second surface. A deformable optical element is mapped on the first electrode or on the first surface.

8 Claims, 4 Drawing Sheets

OPTICAL DEVICE COMPRISING A POLYMER ACTUATOR

FIELD OF THE INVENTION

The invention relates to an optical device comprising an optical element which can be deformed so as to modify its optical characteristics.

The invention may be used in any apparatus or device in which optical characteristics of an optical element have to be changed, such as the focus of a lens or the pitch of a diffraction grating.

BACKGROUND OF THE INVENTION

The Patent of United States published under reference US 2001/0040735A1 describes a variable-focus lens. The variable-focus lens is constructed by making small changes in the equatorial diameter of an elastically deformable lens. The lens may be deformed by radial tension exerted in a plane generally perpendicular to the optical axis. The radial tension may be exerted by mechanical means or by rings embedded in or attached to the equator of the lens, whose diameter can be altered by heating or by the application of an electric or magnetic field.

The technique described in the prior art document not only implies the use of complicated and numerous actuators for changing the focus of the lens, but it is also difficult to implement in small devices or apparatus.

OBJECT AND SUMMARY OF THE INVENTION

It is an object of the invention to propose an improved optical device for deforming an optical element.

To this end, the optical device according to the invention comprises:
- a polymer film comprising a first surface and a second surface,
- a first electrode mapped on said first surface,
- a second electrode mapped on said second surface,
- a deformable optical element mapped on said first electrode or on said first surface.

When a voltage difference is applied between the two electrodes, the Maxwell stress phenomenon causes the polymer film to lengthen in planar direction, and this elongation is transmitted to the deformable optical element. The optical characteristics of the optical element change as result of its deformation.

Since the optical element is in direct contact with the polymer film, the optical device is of small size.

Since the elongation of the polymer film depends on the voltage difference applied between the electrodes, the deformation of the optical element is easily controllable.

In particular, said optical element is a circular lens or a diffraction grating.

The optical device can thus be used for varying the focus of a lens or the pitch of a diffraction grating.

In a preferred embodiment, the optical element is made of silicone rubber or made of cyclic olefin copolymer.

Such materials have characteristics that lead to a good compromise between optical quality and the ability to deform.

In a preferred embodiment, the polymer film is made of silicone rubber or acrylic dielectric elastomer.

Such materials allow a substantial deformation so that the optical characteristics of the optical element can be modified in a large proportion.

In a preferred embodiment, the first electrode and the second electrode have the shape of a circle.

In a preferred embodiment, the first electrode and the second electrode have the shape of a ring.

If electrodes are made of transparent material, a light beam can pass through the polymer film and the optical element along its optical axis. This feature relates in particular to the circular lens.

Electrodes having the shape of rings allow the use of either transparent or non-transparent materials for the electrodes.

The invention also relates to a polymer film sandwiched between two electrodes intended to receive a voltage difference, for deforming an optical element in contact with said polymer film or said electrodes.

The property of such a film and the particular arrangement of the polymer film with respect to the electrodes is advantageously used for deforming the optical element under an electrical control.

The invention also relates to a method of changing the optical characteristics of an optical element, said method comprising the steps of:
- mapping a first electrode on a first surface of a polymer film,
- mapping a second electrode on a second surface of said polymer film,
- mapping said optical element on said first electrode or on said first surface,
- applying a voltage difference between said first electrode and said second electrode.

Such a method can be used for changing electrically the optical characteristic of an optical element.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

The invention utilizes the Maxwell stress phenomenon. This phenomenon relates to the deformation of a polymer material sandwiched between two electrodes. When a voltage difference is applied between said electrodes, the electrostatic forces resulting from the free charges squeeze and stretch the polymer.

Figure 1A:
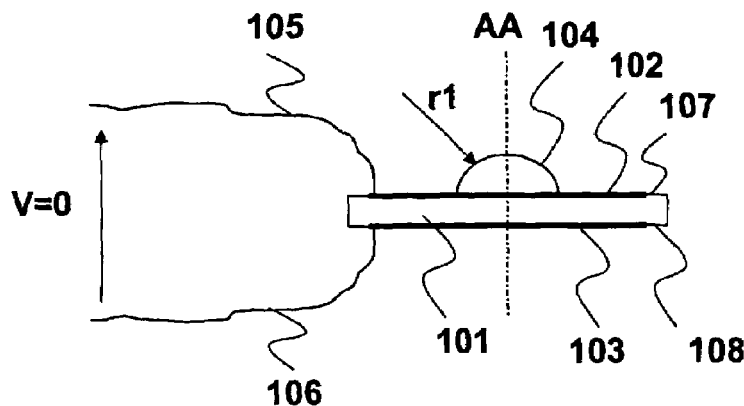
FIG. 1A depicts a first embodiment of an optical device according to the invention, in a first state.

FIG. 1A depicts a first embodiment of an optical device according to the invention in a first state. This embodiment comprises:

a polymer film 101 comprising a first surface 107 and a second surface 108. The polymer film 101 is advantageously made of silicone rubber or acrylic dielectric elastomer (for example the elastomers referred to as NuSil's CF19-2186 and VHB 4910 acrylic). The characteristics of dielectric polymers are such that they are soft (compliant), have a relatively high dielectric constant (approximately 3 or more), and have a high breakdown voltage (a few tens up to a hundred kV/mm).

a first electrode 102 mapped on said first surface, a second electrode 103 mapped on said second surface, a deformable optical element 104 mapped on said first electrode 102. The optical element corresponds to a circular lens advantageously made of silicone rubber or made of cyclic olefin copolymer (COC). The lens may be fixed on the electrodes directly or by means of glue. The lens has a radius of curvature of value r1.

This optical device is advantageously symmetrical around axis AA, which corresponds to the optical axis of the optical element 104.

The first electrode 102 is connected to a wire 105, and the second electrode 103 is connected to a wire 106. Wires 105 and 106 are intended to be connected to a voltage difference V.

The electrodes are made of compliant (soft) material so that they can deform with the polymer film. The electrodes may be deposited via spraying, screen printing, or photolithography. The electrodes can be made of graphite paste, very thin metal wires, or very thin metal films.

The electrodes are advantageously made of transparent material, so that a light beam can pass through the lens, the polymer film, and the electrodes. In that case, the electrodes are made, for example, of material known as "pdot" used in polymer LED displays.

Figure 1B:
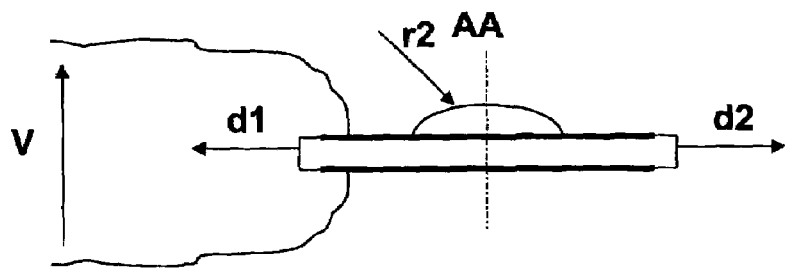
FIG. 1B depicts the first embodiment in a second state.

In a second state depicted in FIG. 1B, a voltage difference V is applied between the electrodes via the wires 105–106. The polymer film 101 (and the electrodes 102–103) expand as a consequence in the radial directions d1 and d2, in a plane parallel to the plane defined by the polymer film. As a consequence, the lens 104 also deforms, which causes its radius of curvature r2 to change.

The strain of the polymer film (generally of the order of several tens percents) has a quadratic relation to the voltage difference V. It must be of the order of a few kV, depending on the thickness of the polymer film. To reduce the voltage, a multi-layered structure may be advantageously made.

Figure 1C:
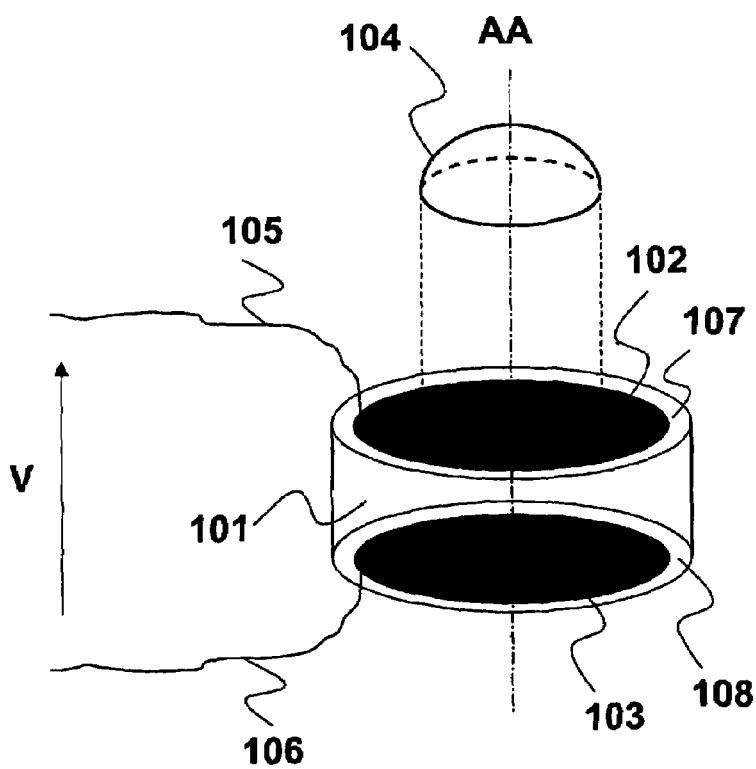
FIG. 1C depicts the first embodiment in a three-dimensional exploded view.

FIG. 1C depicts the first embodiment of FIG. 1A and FIG. 1B in a three-dimensional exploded view. The polymer film preferably has a circular shape so that its deformation is symmetrical in the radial directions. Advantageously, the optical axis AA of the lens 104 is perpendicular to the plane defined by the polymer film 101.

Figure 1D:
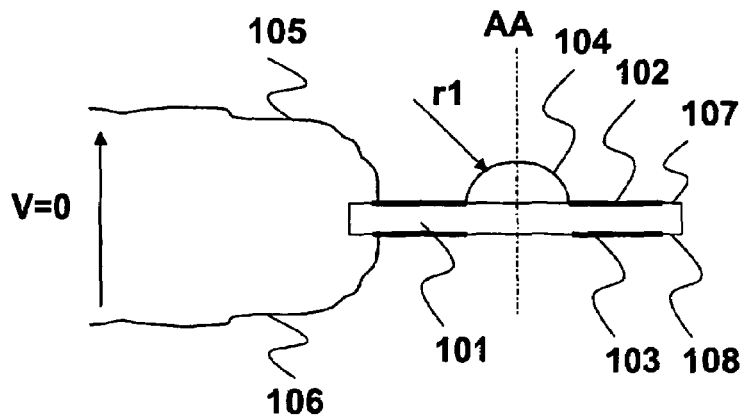
FIG. 1D depicts an alternative of the first embodiment, in a first state.

FIG. 1D depicts an alternative of the first embodiment according to the invention, in a first state. It differs from FIG. 1A, FIG. 1B, and FIG. 1C in that the circular lens 104 is mapped on the first surface 107. Moreover, the partial area of the second surface 108 in front of the optical lens is not covered by said second electrode. The electrodes 102–103 thus form a ring centred around the optical axis AA of the lens 104. This alternative allows the use of transparent as well as non-transparent electrodes 102–103.

Figure 1E:
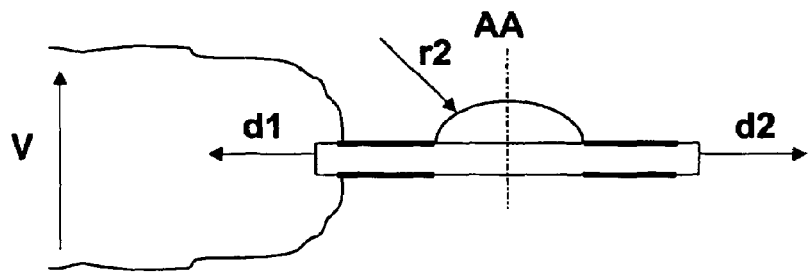
FIG. 1E depicts the alternative of the first embodiment in a second state.

In a second state depicted in FIG. 1E, a voltage difference V is applied between the electrodes via the wires 105–106. The polymer film 101 (and the electrodes 102–103) expand in the radial directions d1 and d2, in a plane parallel to the plane defined by the polymer film. As a consequence, the lens 104 also deforms, which causes its radius of curvature r2 to change.

Figure 1F:
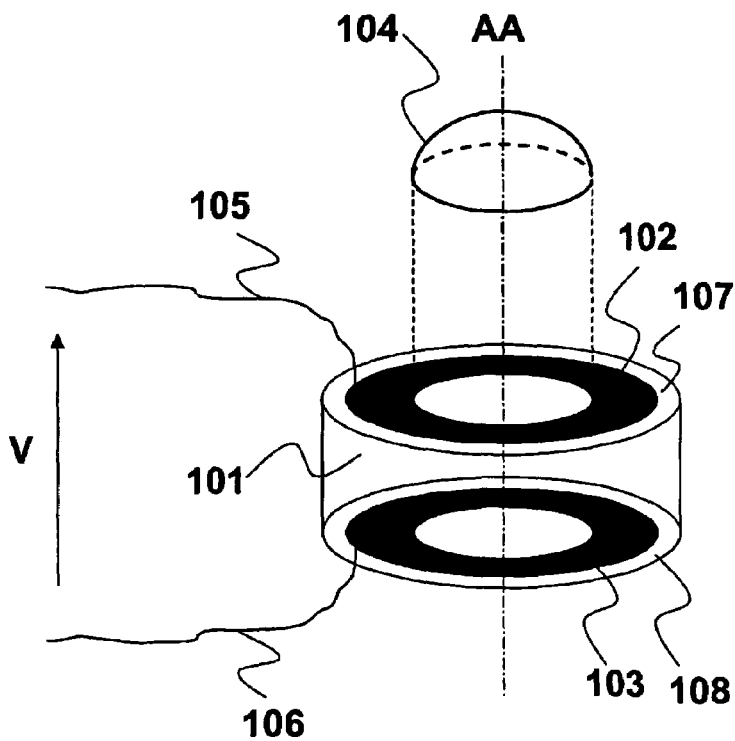
FIG. 1F depicts the alternative of the first embodiment in a three-dimensional exploded view.

FIG. 1F depicts the first embodiment as described in FIG. 1D and FIG. 1E in a three-dimensional exploded view.

Figure 2A:
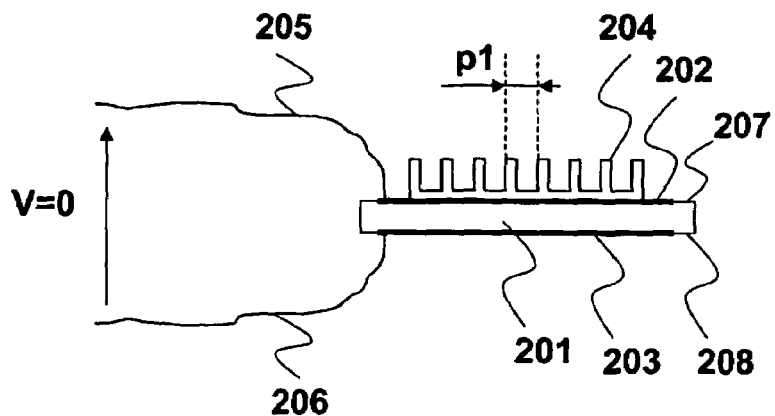
FIG. 2A depicts a second embodiment of an optical device according to the invention in a first state.

FIG. 2A depicts a second embodiment of an optical device according to the invention in a first state. This embodiment comprises:

a polymer film 201 comprising a first surface 207 and a second surface 208. The polymer film 201 is advantageously made of silicone rubber or acrylic dielectric elastomer (for example the elastomers referred to as NuSil's CF19-2186 and VHB 4910 acrylic). The characteristics of dielectric polymers are such that they are soft (compliant), have a relatively high dielectric constant (approximately 3 or more), and have a high breakdown voltage (a few tens up to a hundred kV/mm).

a first electrode 202 mapped on said first surface, a second electrode 203 mapped on said second surface, a deformable optical element 204 mapped on said first electrode 202. The optical element corresponds to a diffraction grating having a base surface advantageously made of silicone rubber or made of cyclic olefin copolymer (COC). The grating may be fixed directly on the electrodes or by means of glue. The diffraction grating has a pitch of value p1.

The first electrode 202 is connected to a wire 205, and the second electrode 203 is connected to a wire 206. Wires 205 and 206 are intended to be connected to a voltage difference V.

The electrodes are made of compliant (soft) material so that they can deform with the polymer film. The electrodes may be deposited via spraying, screen printing, or photolithography. The electrodes may be made of graphite paste, very thin metal wires, or very thin metal films.

Figure 2B:
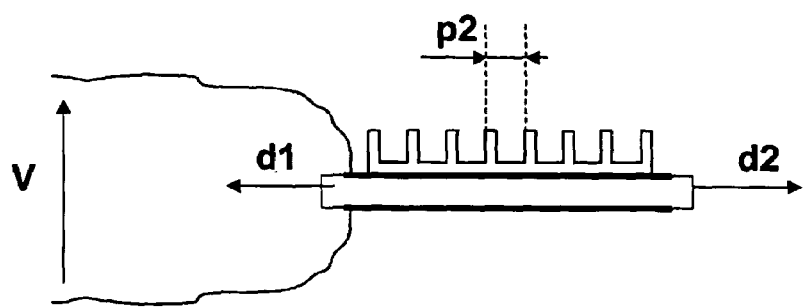
FIG. 2B depicts the second embodiment in a second state.

In a second state depicted in FIG. 2B, a voltage difference V is applied between the electrodes via the wires 205–206. The polymer film 201 (and the electrodes 202–203) expand in the directions d1 and d2, in a plane parallel to the plane defined by the polymer film. As a consequence, the diffraction grating 204 also deforms along its grating vector, which causes its pitch p2 to change.

The electrodes are advantageously made of transparent material, so that a light beam can pass through the grating, the polymer film, and the electrodes. In that case, the electrodes are made, for example, of material known as "pdot" used in polymer LED displays.

The strain of the polymer film (generally of the order of several tens percents) has a quadratic relation to the voltage difference V. It must be of the order of a few kV, depending on the thickness of the polymer film. To reduce the voltage, a multi-layered structure may be advantageously made.

Figure 2C:
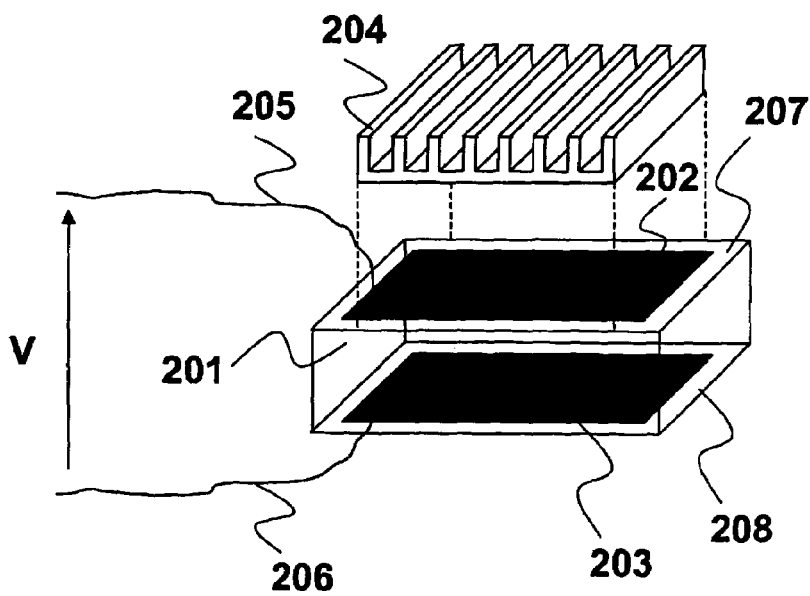
FIG. 2C depicts the second embodiment in a three-dimensional exploded view.

FIG. 2C depicts the second embodiment of FIG. 2A and FIG. 2B in a three-dimensional exploded view. The polymer film preferably has a rectangular shape having its sides parallel and perpendicular to the structure of the diffraction grating.

Figure 2D:
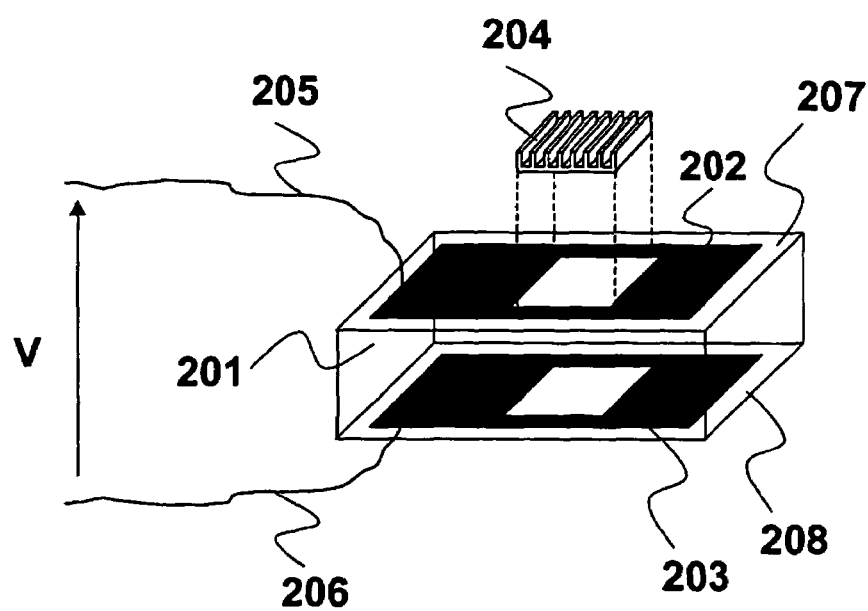
FIG. 2D depicts an alternative of the second embodiment in a three-dimensional exploded view.

FIG. 2D depicts in a three-dimensional exploded view, an alternative of the second embodiment according to the invention. It differs from FIG. 2A, FIG. 2B, and FIG. 2C in that the grating 204 is mapped on the first surface 207. Moreover, the partial area of the second surface 208 in front of the grating is not covered by said second electrode. The electrodes 202–203 thus form a rectangular or square surrounding. This alternative allows the use of transparent as well as non-transparent electrodes 202–203.

The deformation of the film polymer depends on the modulus of the material used, the shape of the material, as well as boundary conditions.

The invention is not limited to the shapes described for the polymer film. Indeed, other shapes could be defined for deforming in a non-uniform way the optical element mapped on said polymer film.

The invention also relates to a polymer film sandwiched between two electrodes for deforming an optical element.

The invention also relates to a method of changing the optical characteristics of an optical element, said method comprising the steps of:

mapping a first electrode on a first surface of a polymer film, mapping a second electrode on a second surface of said polymer film, mapping said optical element on said first electrode or on said first surface, applying a voltage difference between said first electrode and said second electrode.

The invention claimed is:

1. An optical device comprising: a polymer film comprising a first surface and a second surface, a first electrode mapped on said first surface, a second electrode mapped on said second surface, a deformable optical element mapped on said first electrode or on said first surface, wherein said deformable optical element is configured to deform substantially along at least one of a direction radial to an optical axis of said deformable optical element and a plane parallel to said polymer film by increasing a length of the polymer film substantially along the direction radial to the optical axis.

2. The optical device as claimed in claim 1, wherein said optical element is a circular lens or a diffraction grating.

3. The optical device as claimed in claim 1 or 2, wherein said optical element is made of silicone rubber or of cyclic olefin copolymer.

4. The optical device as claimed in claim 1, wherein said polymer film is made of silicone rubber or acrylic dielectric elastomer.

5. The optical device as claimed in claim 1, wherein said first electrode and said second electrode have the shape of a circle.

6. The optical device as claimed in claim 1, wherein said first electrode and said second electrode have the shape of a ring.

7. An optical device comprising:
a polymer film;
a plurality of electrodes; and
an optical element in contact with the polymer film or at least one of said plurality of electrodes;
the polymer film being sandwiched between the two electrodes and configured to receive a voltage difference, for deforming the optical element, wherein the deformable optical element is further configured to deform substantially along at least one of a direction radial to an optical axis of the deformable optical element and a plane parallel to the polymer film by increasing a length of the polymer film substantially along the direction radial to the optical axis.

8. A method of changing the optical characteristics of an optical element, said method comprising the acts of:

mapping a first electrode on a first surface of a polymer film, mapping a second electrode on a second surface of said polymer film, mapping said optical element on said first electrode or on said first surface, and applying a voltage difference between said first electrode and said second electrode, wherein, in response to said applying act, said optical element is configured to deform substantially along at least one of a direction radial to an optical axis of said optical element and a plane parallel to said polymer film by increasing a length of said polymer film substantially along the direction radial to the optical axis.

* * * * *